Jan. 7, 1930. P. C. PRESCOTT-RICHARDSON 1,743,006

EARRING GUARD

Filed Feb. 23, 1928

WITNESSES

INVENTOR
Percival C. Prescott-Richardson.
BY
ATTORNEY

Patented Jan. 7, 1930

1,743,006

UNITED STATES PATENT OFFICE

PERCIVAL C. PRESCOTT-RICHARDSON, OF NEW YORK, N. Y.

EARRING GUARD

Application filed February 23, 1928. Serial No. 256,317.

The device of the present invention is primarily intended to prevent the loss of valuable earrings, particularly earrings of the type which are attached to the lobe of the ear merely by clamping means instead of passing them through a perforation in the ear lobe. In accordance with the present invention I provide a guard or safety device which prevents the loss of earrings and which is inconspicuous and for the most part concealed in use.

The device may also have a secondary function which consists in supporting additional pendant ear ornaments.

Other and more general objects of the invention are to provide an earring guard of simple, practical construction, which will be rugged, durable and efficient in use, easy to apply and remove, and well suited to the requirements of economical manufacture.

With the above noted and other objects in view, the invention consists in certain novel features of construction and combinations and arrangements of parts as will be more fully hereinafter set forth and pointed out in the claim. The invention will be more fully understood from the following description in connection with the accompanying drawings, wherein—

Figure 1:
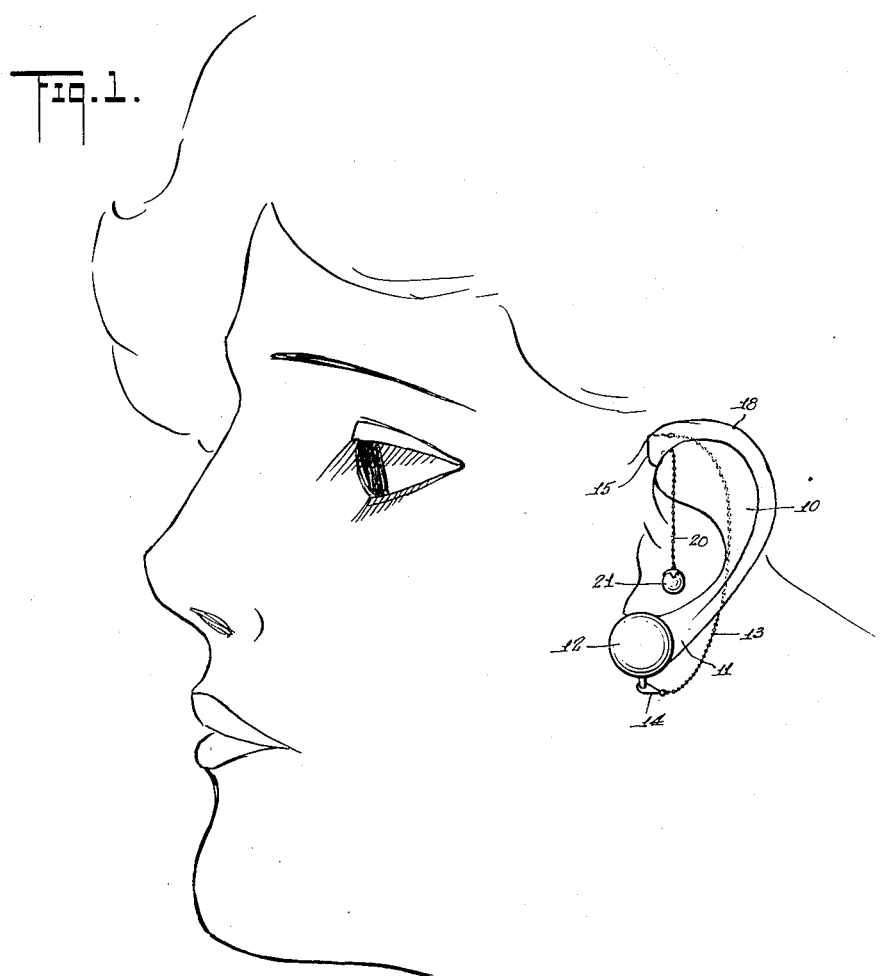
Fig. 1 is a perspective view showing one of my improved earring guards used to protect a clamp-on earring and also used to suspend a supplemental ear ornament.

In the drawings I have used the reference numeral 10 to designate a human ear, to the lobe 11 of which an earring 12 may be attached in any conventional manner, such for instance as by clamping this ornament to the lobe of the ear.

Figure 2:
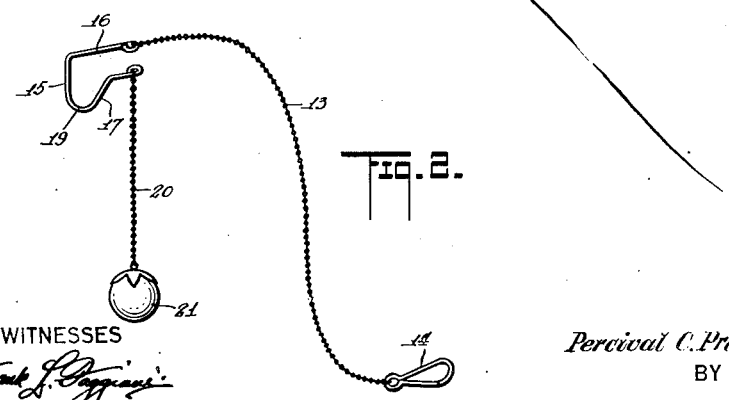
Fig. 2 is a perspective view showing the guard and the supplemental ornament removed from the ear.

The present invention is primarily designed as a safety guard to prevent the accidental loss of such earrings if the clamping means works loose. The guard member as best seen in Fig. 2 consists essentially of a chain or other suitable flexible device 13 mounting at one end an attaching member 14 adapted to be engaged with the earring 12 and carrying at its other end an ear-engaging anchoring member, such for instance as the generally U-shaped spring clip 15.

The legs 16 and 17 of the U-shaped clip 15 are adapted to straddle the helix 18 of the ear adjacent the upper forward extremity of the helix. The leg 16 lying behind the helix is straight, and the leg 17 is offset as at 19 to accommodate the flange of the helix.

The member 15 is preferably formed of light spring wire so that the arms may be conveniently spread apart if necessary to receive the helix of the ear between them. In use, the chain 13 is substantially concealed behind the ear, only the lower end thereof being visible, which lower end is attached to the earring 12 by the attaching member 14.

The chain 13 is preferably anchored to the straight leg of the clamping member 15, and if desired, a second chain 20 may be anchored to the end of the other leg 17, such chain carrying a pendant ornament 21 providing a further and supplemental ear decoration, as best seen in Fig. 1.

Structurally, the ear-engaging member 15 is subject to a wide range of variations, and may be formed out of various types of material.

I have found thin spring wire to be particularly desirable in that it is inconspicuous in use, comfortable to wear, and well suited to meet manufacturing requirements.

Obviously, various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claim.

I claim:

An earring guard including a member adapted to embrace the helix of the ear at the upper forward portion of the former, and a flexible device attached to said member adapted to lie in substantially concealed position behind the ear and engage an earring attached to the ear lobe, said member being shaped to straddle and embrace the helix of the ear, and offset to accommodate the flange of the helix.

Signed at New York city, N. Y., in the county of New York and State of New York, this 18th day of February A. D. 1928.

PERCIVAL C. PRESCOTT-RICHARDSON.